US007799855B2

(12) United States Patent
Ebeling et al.

(10) Patent No.: US 7,799,855 B2
(45) Date of Patent: Sep. 21, 2010

(54) FLAME RETARDANT THERMOPLASTIC POLYCARBONATE COMPOSITIONS, USE AND METHOD THEREOF

(75) Inventors: Thomas Ebeling, Evansville, IN (US); Monica Martinez Marugán, Bergen op Zoom (NL); Srinivas Siripurapu, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 490 days.

(21) Appl. No.: 10/957,799

(22) Filed: Oct. 4, 2004

(65) Prior Publication Data

US 2006/0074156 A1 Apr. 6, 2006
US 2008/0227896 A9 Sep. 18, 2008

Related U.S. Application Data

(63) Continuation-in-part of application No. 10/015,049, filed on Nov. 12, 2001, now abandoned.

(51) Int. Cl.
*C08K 5/523* (2006.01)
(52) U.S. Cl. .................. 524/127; 524/140; 524/141
(58) Field of Classification Search .................. 524/127, 524/140–141
See application file for complete search history.

(56) References Cited

U.S. PATENT DOCUMENTS

| 3,511,895 A | 5/1970 | Kydonieus et al. |
| 3,635,895 A | 1/1972 | Kramer |
| 3,686,355 A | 8/1972 | Gaines, Jr. et al. ....... 260/824 R |
| 3,775,367 A | 11/1973 | Nouvertne |
| 3,981,944 A | 9/1976 | Okamoto et al. |
| 3,988,389 A | 10/1976 | Margotte et al. ............ 260/873 |
| 4,001,184 A | 1/1977 | Scott |
| 4,046,836 A | 9/1977 | Adelmann et al. |
| 4,154,775 A | 5/1979 | Axelrod |
| 4,217,438 A | 8/1980 | Brunelle et al. |
| 4,238,597 A | 12/1980 | Markezich et al. |
| 4,272,584 A | 6/1981 | Goldberg et al. |
| 4,284,549 A | 8/1981 | Salee ...................... 260/40 R |
| 4,305,856 A | 12/1981 | Sakano et al. |
| 4,391,935 A | 7/1983 | Bialous et al. |
| 4,473,685 A | 9/1984 | Mark |
| 4,487,896 A | 12/1984 | Mark et al. |
| 4,555,384 A | 11/1985 | Morris et al. ................ 422/109 |
| 4,569,970 A | 2/1986 | Paul et al. |
| 4,579,906 A | 4/1986 | Zabrocki et al. |
| 4,600,632 A | 7/1986 | Paul et al. |
| 4,654,400 A | 3/1987 | Lohmeijer et al. |
| 4,746,701 A | 5/1988 | Kress et al. |
| 4,756,701 A | 7/1988 | Danko et al. .................. 445/22 |
| 4,767,818 A | 8/1988 | Boutni |
| 4,782,115 A | 11/1988 | Paul et al. |
| 4,788,252 A | 11/1988 | de Boer et al. |
| 4,927,880 A | 5/1990 | DeRudder et al. |
| 4,931,503 A | 6/1990 | Boutni et al. |
| 4,983,658 A | 1/1991 | Kress et al. |
| 4,997,883 A | 3/1991 | Fischer et al. |
| 5,023,297 A | 6/1991 | Boutni |
| 5,036,126 A | 7/1991 | Rinrhart et al. |
| 5,109,076 A | 4/1992 | Freitag et al. |
| 5,126,428 A | 6/1992 | Freitag et al. ................ 528/196 |
| 5,185,399 A | 2/1993 | Inoue |
| 5,266,618 A | 11/1993 | Watanabe et al. |
| 5,322,882 A | 6/1994 | Okamoto |
| 5,360,861 A | 11/1994 | Campbell |
| 5,380,795 A | 1/1995 | Gosens et al. |
| 5,391,600 A | 2/1995 | Umeda et al. |
| 5,391,603 A | 2/1995 | Wessel et al. |
| 5,414,045 A | 5/1995 | Sue et al. |
| 5,451,624 A | 9/1995 | Memon et al. |
| 5,451,632 A | 9/1995 | Okumura et al. |
| 5,455,310 A | 10/1995 | Hoover et al. ............... 525/431 |
| 5,488,086 A | 1/1996 | Umeda et al. |
| 5,521,230 A | 5/1996 | Bhatia et al. |
| 5,530,083 A | 6/1996 | Phelps et al. |
| 5,602,201 A | 2/1997 | Fujiguchi et al. |
| 5,608,026 A | 3/1997 | Hoover et al. |
| 5,616,674 A | 4/1997 | Michel et al. |
| 5,658,974 A | 8/1997 | Fuhr et al. |
| 5,723,541 A | 3/1998 | Ingenito et al. |
| 6,001,929 A | 12/1999 | Nodera et al. |
| 6,072,011 A | 6/2000 | Hoover |
| 6,252,013 B1 | 6/2001 | Banach et al. ............... 525/464 |
| 6,306,507 B1 | 10/2001 | Brunelle et al. .......... 428/423.7 |
| 6,308,142 B1 | 10/2001 | Choate et al. |
| 6,545,089 B1 | 4/2003 | DeRudder et al. |

(Continued)

FOREIGN PATENT DOCUMENTS

BE 1006984 A3 2/1995

(Continued)

OTHER PUBLICATIONS

EP0206006A1. "Thermoplastic Moulding compositions having a part strength of their coalescence seams". Publication Date Dec. 30, 1986. (Abstract Only).

(Continued)

*Primary Examiner*—Peter Szekely
(74) *Attorney, Agent, or Firm*—Cantor Colburn LLP

(57) ABSTRACT

A thermoplastic composition contains about 20 to about 90 wt. % of a polycarbonate resin; up to about 35 wt. % of an impact modifier; about 0.5 to about 30 wt. % of a polysiloxane-polycarbonate copolymer; and about 0.5 to about 20 wt. % of a phosphorus-containing flame retardant, each based on the total combined weight of the thermoplastic composition, exclusive of any filler. An article of manufacture having a wall having a thickness of 3 mm or less may be made using the composition, e.g., by molding, extruding, or shaping the above-described composition into an article. Alternatively, an article may be made by ultrasonically welding a first part comprising the foregoing composition a second part.

34 Claims, 4 Drawing Sheets

U.S. PATENT DOCUMENTS

| | | | |
|---|---|---|---|
| 6,559,270 B1 | 5/2003 | Siclovan et al. | |
| 6,576,706 B1 | 6/2003 | Nodera et al. | |
| 6,596,794 B1 | 7/2003 | Eckel et al. | |
| 6,613,820 B2 | 9/2003 | Fujiguchi et al. | |
| 6,630,525 B2* | 10/2003 | Cella et al. | 524/100 |
| 6,657,018 B1 | 12/2003 | Hoover | 525/464 |
| 6,921,785 B2* | 7/2005 | Campbell et al. | 524/127 |
| 7,091,267 B2* | 8/2006 | Venderbosch et al. | 524/154 |
| 2002/0193476 A1* | 12/2002 | Mitsuta et al. | 524/115 |
| 2003/0092837 A1 | 5/2003 | Eichenauer | |
| 2003/0105226 A1 | 6/2003 | Cella et al. | |
| 2003/0119986 A1 | 6/2003 | Eichenauer | |
| 2003/0139504 A1* | 7/2003 | Miebach et al. | 524/261 |
| 2003/0191245 A1 | 10/2003 | Nodera et al. | |
| 2003/0203990 A1 | 10/2003 | DeRudder et al. | |
| 2004/0011999 A1 | 1/2004 | Murray | |
| 2004/0039145 A1 | 2/2004 | Silva et al. | 528/25 |
| 2004/0102549 A1 | 5/2004 | Bajgur et al. | |
| 2004/0220330 A1 | 11/2004 | DeRudder et al. | |
| 2005/0085580 A1* | 4/2005 | Marugan et al. | 524/431 |
| 2005/0182165 A1* | 8/2005 | Ma et al. | 524/115 |
| 2006/0014919 A9* | 1/2006 | Venderbosch et al. | 528/196 |
| 2006/0030647 A1* | 2/2006 | Ebeling et al. | 524/115 |

FOREIGN PATENT DOCUMENTS

| | | |
|---|---|---|
| DE | 40 16 417 A1 | 11/1991 |
| DE | 4024667 A1 | 2/1992 |
| EP | 0186917 B1 | 10/1985 |
| EP | 0266596 B1 | 10/1987 |
| EP | 0272425 B1 | 11/1987 |
| EP | 0 248 308 A2 | 12/1987 |
| EP | 0247430 B1 | 12/1987 |
| EP | 0 254 054 B1 | 1/1988 |
| EP | 0 283 776 A2 | 3/1988 |
| EP | 0326938 B1 | 1/1989 |
| EP | 0 369 345 A2 | 5/1990 |
| EP | 0 376 052 B1 | 7/1990 |
| EP | 0 387 570 B1 | 9/1990 |
| EP | 0 520 186 B1 | 5/1992 |
| EP | 0 567 655 B1 | 11/1992 |
| EP | 0522753 A2 | 1/1993 |
| EP | 0 595 187 B1 | 10/1993 |
| EP | 0 600 196 B1 | 10/1993 |
| EP | 0 628 600 B1 | 5/1994 |
| EP | 0635547 A2 | 1/1995 |
| EP | 0 645 422 A1 | 3/1995 |
| EP | 0 434 848 B1 | 9/1995 |
| EP | 0707045 B1 | 10/1995 |
| EP | 0 692 522 B1 | 1/1996 |
| EP | 0780438 A2 | 6/1997 |
| EP | 0 936 243 A2 | 2/1999 |
| EP | 0 517 927 B1 | 6/1999 |
| EP | 1 162 235 B1 | 12/1999 |
| GB | 2 043 083 A | 10/1980 |
| JP | 54040852 | 3/1979 |
| JP | 56014549 | 2/1981 |
| JP | 58011540 | 1/1983 |
| JP | 10-007897 | 1/1988 |
| JP | 4298554 | 10/1992 |
| JP | 6322545 | 11/1994 |
| JP | 7082467 | 3/1995 |
| JP | 2003171547 | 6/2003 |
| WO | WO 80/00084 | 1/1980 |
| WO | WO 86/00083 | 1/1986 |
| WO | WO 91/18052 | 11/1991 |
| WO | WO 01/72905 A2 | 10/2001 |
| WO | WO 02/50185 A2 | 6/2002 |
| WO | WO 03/025060 A1 | 3/2003 |
| WO | WO 03/025061 A2 | 3/2003 |
| WO | WO 2004/076541 A2 | 9/2004 |
| WO | WO 2005/037921 | 4/2005 |
| WO | 2005075568 A2 | 8/2005 |
| WO | WO 2005/075549 | 8/2005 |

OTHER PUBLICATIONS

EP0247430A2. "Flame-retarding thermoplastic moulding composition" Publication Date Dec. 2, 1987. (Abstract Only).

EP0248308A2. "Moulding compunds with easy mould releasability". Publication Date: Dec. 9, 1987. (Abstract Only).

EP0387570. "Blends of polydiorganosiloxane-polycarbonate-block cocondensates with siloxanes and with elastomeric polymerisation products". Publication Date: Sep. 19, 1990. (Abstract Only).

DE4016417. "Polycarbonate flame retardant alloys-contain copolymer, graft polymer and poly:organo:siloxane-polycarbonate block copolymer, for good mechanical properties". Publication Date: Nov. 28, 1991. (Abstract only).

European Search Report for EP 05 25 4891. Dated Nov. 15, 2005.

JP06-184424. "Polycarbonate Resin Composition". Publication Date: Jul. 5, 1994. (Abstract Only).

JP 07-196873. "Flame-Retardant Resin Composition". Publication Date: Dec. 28, 1993. (Abstract Only).

ASTM D256 Standard Test Methods for Determining the Izod Pendulum Impact Resistance of Plastics, 20 pages.

UL94 Tests for Flammability of Plastic Materials for Parts in Devices and Appliances, 52 pages.

ISO 11443 Plastics-Determination of the fluidity of plastics using capillary and slit-die rheometers, 52 pages.

International Search Report for International Application No. PCT/US2004/041947 Mailed Apr. 4, 2005.

BE 10 06984; Publication Date: Feb. 7, 1995 (Abstract only).

DE 4024667; Publication Date: Feb. 6, 1992 (Abstract only).

EP 0247430; Publication Date: Dec. 2, 1987 (Abstract only).

JP 04 225062;Publication Date: Aug. 14, 1992 (Abstract only).

Umeda Takashi, Okamoto Masaya; Polycarbonate Resin Composition, Patent Abstracts of Japan, Aug. 14, 1992, Copyright (C); 1998, 2003 Japan Patent Office.

Fujiguchi Tomohide, Saito Akihiro, Itoi Hideyuki; Flame-Retardant Resin Composition, Patent Abstracts of Japan, Aug. 1, 1995, Copyright (C); 1998, 2003 Japan Patent Office.

DE 40 16 417; Polycarbonate flame retardant alloys—contain copolymer, graft polymer and poly:organo:siloxane-polycarbonate block copolymer, for good mechanical properties: Publication Date: Nov. 28, 1991; Abstract.

EP 0 248 308; Moulding compounds with easy mould releasability; Publication Date: Dec. 9, 1987; Abstract.

EP 0 387 570; Blends of polydiorganosiloxane-polycarbonate-block -cocondensates with Siloxanes and with elastomeric polymerisation products; Publication Date: Sep. 19, 1990; Abstract.

JP 56014549; Thermoplastic resin composition having good heat cycle property; Publication Date: Dec. 15, 1981; Abstract.

JP 6322545; Plated resin product; Publication Date: Nov. 22, 1994; Abstract.

JP 7082467; Impact-resistant resin composition; Publication Date: Mar. 28, 1995; Abstract.

JP 58011540; Thermoplastic resin composition; Publication Date: Jan. 22, 1983; Abstract.

JP 4298554; Flame-retardant resin composition; Publication Date: Oct. 22, 1992; Abstract.

Japanese Publication No. 10-007897; Polycarbonate resin; Publication Date: Jan. 13, 1998; Abstract.

JP 10101920; Polycarbonate resin composition; Publication Date: Apr. 21, 1998; Abstract.

International Search Report for International Application No. PCT/US2005/035432 mailed Mar. 2, 2006.

International Search Report for International Application No. PCT/US2005/044519, mailed Nov. 5, 2006.

* cited by examiner

FLAME RETARDANT THERMOPLASTIC POLYCARBONATE COMPOSITIONS, USE AND METHOD THEREOF

CROSS REFERENCE TO RELATED APPLICATIONS

This application is a Continuation-In-Part of, and claims the benefit of, U.S. utility application entitled, "FLAME RETARDANT RESINOUS COMPOSITIONS AND METHOD" having Ser. No. 10/015,049, filed Nov. 12, 2001 now abandoned.

BACKGROUND OF THE INVENTION

This disclosure relates to thermoplastic polycarbonate compositions, and in particular to flame retardant thermoplastic polycarbonate compositions, methods of manufacture, and use thereof.

Polycarbonates are useful in the manufacture of articles and components for a wide range of applications, from automotive parts to electronic appliances. Because of their broad use, particularly in electronic applications, it is desirable to provide polycarbonates with flame retardancy. Many known flame retardant agents used with polycarbonates contain bromine and/or chlorine. Brominated and/or chlorinated flame retardant agents are less desirable because impurities and/or by-products arising from these agents can corrode the equipment associated with manufacture and use of the polycarbonates. Brominated and/or chlorinated flame retardant agents are also increasingly subject to regulatory restriction.

Nonhalogenated flame retardants have been proposed for polycarbonates, including various fillers, phosphorus-containing compounds, and certain salts. It has been difficult to meet the strictest standards of flame retardancy using the foregoing flame retardants, however, without also using brominated and/or chlorinated flame retardants, particularly in thin samples. In addition, non-brominated and/or non-chlorinated flame retardants can adversely affect desirable physical properties of the polycarbonate compositions, particularly impact strength.

Polysiloxane-polycarbonate copolymers have also been proposed for use as non-brominated and non-chlorinated flame retardants. For example, U.S. Application Publication No. 2003/015226 to Cella discloses a polysiloxane-modified polycarbonate comprising polysiloxane units and polycarbonate units, wherein the polysiloxane segments comprise 1 to 20 polysiloxane units. Use of other polysiloxane-modified polycarbonates are described in U.S. Pat. No. 5,380,795 to Gosens, U.S. Pat. No. 4,746,701 to Kress et al., U.S. Pat. No. 5,488,086 to Umeda et al., and EP 0 692 522B1 to Nodera, et al., for example.

While the foregoing flame retardants are suitable for their intended purposes, there nonetheless remains a continuing desire in the industry for continued improvement in flame retardance, including a need for polycarbonate compositions having improved flame retardance without use of brominated and/or chlorinated flame retardants. It would also be advantageous if improved flame retardance could be achieved without substantial degradation of properties such as impact strength.

BRIEF SUMMARY OF THE INVENTION

A thermoplastic composition comprises about 20 to about 90 wt. % of a polycarbonate resin; up to about 35 wt. % of an impact modifier; about 0.5 to about 30 wt. % of a polysiloxane-polycarbonate copolymer; and about 0.5 to about 20 wt. % of a phosphorus-containing flame retardant, each based on the total combined weight of the thermoplastic composition, exclusive of any filler.

In yet another embodiment, an article comprises the above-described composition and has a wall having a thickness of 3 mm or less.

In still another embodiment, a method of manufacture of an article comprises molding, extruding, or shaping the above-described composition into an article having a wall having a thickness of 3 mm or less.

In another aspect, a method for making an article comprising ultrasonically welding a first part comprising a composition as described herein to a second part.

According to another aspect, an article comprises a first part comprising a composition as described herein ultrasonically welded to a second part.

The above described and other features are exemplified by the following figures and detailed description.

BRIEF DESCRIPTION OF THE FIGURES

Referring now to the figures, which are exemplary embodiments, and wherein the like elements are numbered alike.

DETAILED DESCRIPTION OF THE INVENTION

Figure 1:
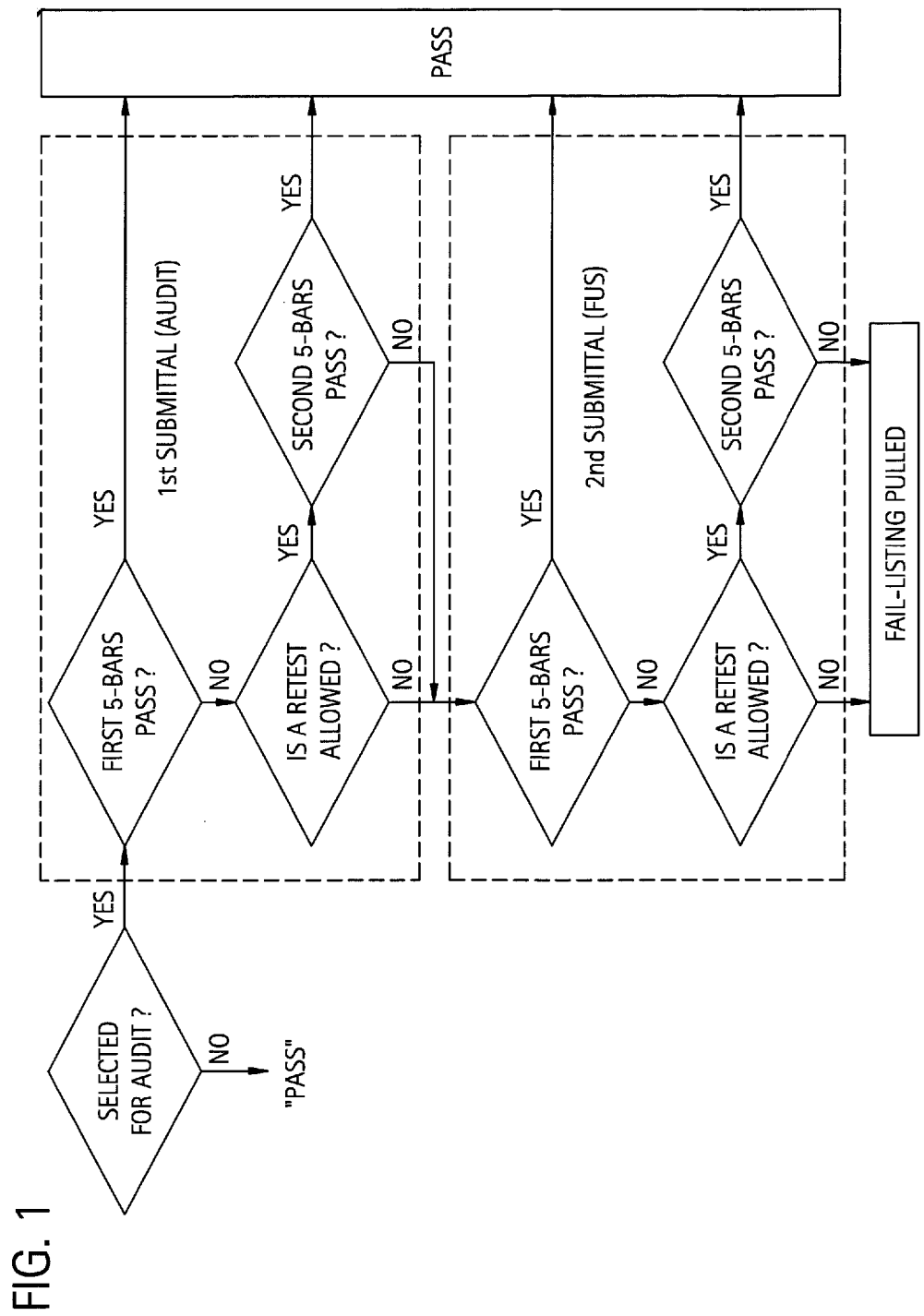
FIG. 1 is a flow chart illustrating the UL Audit/Follow-up Services Process.

Disclosed herein are thermoplastic polycarbonate compositions having improved flame retardance, including flame resistance performance characteristics such as flame out time (FOT) and time to drip (TTD). Without being bound by theory, it is believed that the favorable results obtained herein are obtained by careful balancing of the relative amounts of a polycarbonate as specified below and a polysiloxane-polycarbonate copolymer as specified below, in combination with other components such as an organic phosphorus-containing flame retardant and, optionally, an impact modifier, as specified below. In another advantageous feature, the melt viscosity of the compositions can be adjusted so as to provide a thin article with improved flame retardance and good physical properties.

As used herein, the terms "polycarbonate" and "polycarbonate resin" means compositions having repeating structural carbonate units of the formula (1):

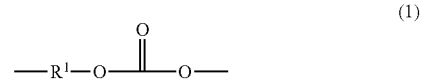

(1)

in which at least about 60 percent of the total number of $R^1$ groups are aromatic organic radicals and the balance thereof are aliphatic, alicyclic, or aromatic radicals. Preferably, each $R^1$ is an aromatic organic radical and, more preferably, a radical of the formula (2):

$$—A^1—Y^1—A^2— \qquad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene.

Polycarbonates can be produced by the interfacial reaction of dihydroxy compounds having the formula HO—$R^1$—OH, which includes dihydroxy compounds of formula (3):

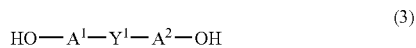

$$HO—A^1—Y^1—A^2—OH \qquad (3)$$

wherein $Y^1$, $A^1$ and $A^2$ are as described above. Also included are bisphenol compounds of general formula (4):

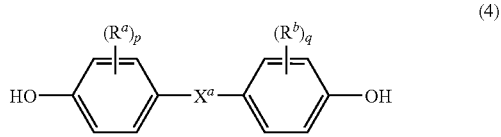

(4)

wherein $R^a$ and $R^b$ each represent a halogen atom or a monovalent hydrocarbon group and may be the same or different; p and q are each independently integers from 0 to 4; and $X^a$ represents one of the groups of formula (5):

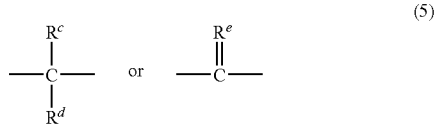

(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted hydrocarbons disclosed by name or formula (generic or specific) in U.S. Pat. No. 4,217,438. A nonexclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as mixtures comprising at least one of the foregoing dihydroxy compounds.

A nonexclusive list of specific examples of the types of bisphenol compounds that may be represented by formula (3) includes 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

It is also possible to employ two or more different dihydroxy compounds or a copolymer of a dihydroxy compounds with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents are well known, and include polyfunctional organic compounds containing at least three functional groups selected from hydroxyl, carboxyl, carboxylic anhydride, haloformyl, and mixtures thereof. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents may be added at a level of about 0.05-2.0 weight percent. Branching agents and procedures for making branched polycarbonates are described in U.S. Pat. Nos. 3,635,895 and 4,001,184, which are incorporated by reference. All types of polycarbonate end groups are contemplated as being useful in the thermoplastic composition.

Preferred polycarbonates are based on bisphenol A, in which each of $A^1$ and $A^2$ is p-phenylene and $Y^1$ is isopropylidene. Preferably, the average molecular weight of the polycarbonate is about 5,000 to about 100,000, more preferably about 10,000 to about 65,000, and most preferably about 15,000 to about 35,000.

In one embodiment, the polycarbonate has flow properties suitable for the manufacture of thin articles. Melt volume flow rate (often abbreviated MVR) measures the rate of extrusion of a thermoplastics through an orifice at a prescribed temperature and load. Polycarbonates suitable for the formation of flame retardant articles may have an MVR, measured at 260° C./2.16 Kg, of about 4 to about 30 grams per centimeter cubed ($g/cm^3$). Polycarbonates having an MVR under these conditions of about 12 to about 30, specifically about 15 to about 30 $g/cm^3$ may be useful for the manufacture of articles having thin walls. Mixtures of polycarbonates of different flow properties may be used to achieve the overall desired flow property.

Methods for the preparation of polycarbonates by interfacial polymerization are well known. Although the reaction conditions of the preparative processes may vary, several of the preferred processes typically involve dissolving or dispersing the dihydric phenol reactant in aqueous caustic soda or potash, adding the resulting mixture to a suitable water immiscible solvent medium and contacting the reactants with the carbonate precursor, such as phosgene, in the presence of a suitable catalyst such as triethylamine or a phase transfer catalyst, and under controlled pH conditions, e.g., about 8 to about 10. The most commonly used water immiscible solvents include methylene chloride, 1,2-dichloroethane, chlorobenzene, toluene, and the like.

Among the preferred phase transfer catalysts that can be used are catalysts of the formula $(R^3)_4Q^+X$, wherein each R3 is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, $CH_3[CH_3(CH_2)_2]_3$ NX wherein X is $Cl^-$, $Br^-$ or—a $C_{1-8}$ alkoxy group or $C_{6-188}$ aryloxy group. An effective amount of a phase transfer catalyst may be about 0.1 to about 10 wt. %, about 0.5 to about 2 wt. % based on the weight of bisphenol in the phosgenation mixture.

Alternatively, melt processes may be used. A catalyst may be used to accelerate the rate of polymerization of the dihydroxy reactant(s) with the carbonate precursor. Representative catalysts include but are not limited to tertiary amines such as triethylamine, quaternary phosphonium compounds, quaternary ammonium compounds, basic alkali metal salts, basic alkali earth metal salts, and the like.

Alternatively, polycarbonates may be prepared by co-reacting, in a molten state, the dihydroxy reactant(s) and a diaryl carbonate ester, such as diphenyl carbonate, in the presence of a transesterification catalyst in a Banbury mixer, twin screw extruder, or the like to form a uniform dispersion. Volatile monohydric phenol is removed from the molten reactants by distillation and the polymer is isolated as a molten residue.

The polycarbonates can be made in a wide variety of batch, semi-batch or continuous reactors. Such reactors are, for example, stirred tank, agitated column, tube, and recirculating loop reactors. Recovery of the polycarbonate can be achieved by any means known in the art such as through the use of an anti-solvent, steam precipitation or a combination of anti-solvent and steam precipitation.

The polysiloxane-polycarbonate copolymers comprise polycarbonate blocks and polydiorganosiloxane blocks. The polycarbonate blocks comprise repeating structural units of formula (1) as described above, and preferably wherein $R^1$ is of formula (2) as described above. These units may be derived from reaction of dihydroxy compounds of formula (3) as described above. In one embodiment, the dihydroxy compound is bisphenol A, in which each of $A^1$ and $A^2$ is p-phenylene and $Y^1$ is isopropylidene.

The polydiorganosiloxane blocks comprise repeating structural units of formula (6):

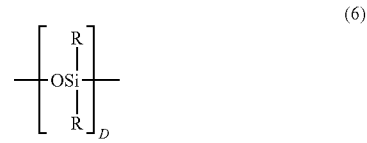

(6)

wherein each occurrence of R is same or different, and is a $C_{1-13}$ monovalent organic radical. For example, R may be a $C_1-C_{13}$ alkyl group, $C_1-C_{13}$ alkoxy group, $C_2-C_{13}$ alkenyl group, $C_2-C_{13}$ alkenyloxy group, $C_3-C_6$ cycloalkyl group, $C_3-C_6$ cycloalkoxy group, $C_6-C_{10}$ aryl group, $C_6-C_{10}$ aryloxy group, $C_7-C_{13}$ aralkyl group, $C_7-C_{13}$ aralkoxy group, $C_7-C_{13}$ alkaryl group, or $C_7-C_{13}$ alkaryloxy group. Combinations of the foregoing R groups may be used in the same copolymer.

D in formula (6) is selected so as to provide an effective level of flame retardance to the thermoplastic composition. The value of D will therefore vary depending on the type and relative amount of each component in the thermoplastic composition, including the type and amount of polycarbonate, impact modifier, polysiloxane-polycarbonate copolymer, and other flame retardants. Suitable values for D may be determined by one of ordinary skill in the art without undue experimentation using the guidelines taught herein. Generally, D has an average value of 2 to about 1000, specifically about 10 to about 100, more specifically about 25 to about 75. In one embodiment, D has an average value of about 40 to about 60, and in still another embodiment, D has an average value of about 50. Where D is of a lower value, e.g., less than about 40, it may be necessary to use a relatively larger amount of the polysiloxane-polycarbonate copolymer. Conversely, where D is of a higher value, e.g., greater than about 40, it may be necessary to use a relatively smaller amount of the polysiloxane-polycarbonate copolymer.

In one embodiment the polydiorganosiloxane blocks comprise repeating structural units of formula (7):

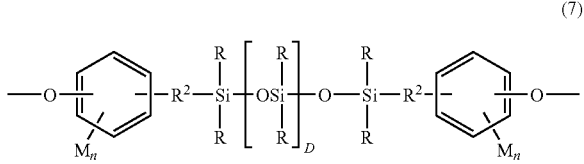

(7)

wherein R and D are as defined above.

$R^2$ in formula (7) is a divalent $C_2-C_8$ aliphatic group. Each M in formula (7) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (8):

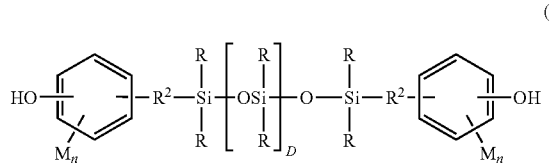

wherein R, D, M, $R^2$, and n are as described above.

Such dihydroxy polysiloxanes can be made by effecting a platinum catalyzed addition between a siloxane hydride of the formula (9):

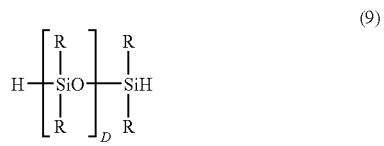

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polysiloxane-polycarbonate copolymer may be manufactured by reaction of dihydroxy polysiloxane (8) with a carbonate source and a dihydroxy aromatic compound of formula (3), optionally in the presence of a phase transfer catalyst as described above. Suitable conditions are similar to those useful in forming polycarbonates. Preferably, the copolymers are prepared by phosgenation, at temperatures from below 0° C. to about 100° C., preferably about 25° C. to about 50° C. Since the reaction is exothermic, the rate of phosgene addition may be used to control the reaction temperature. The amount of phosgene required will generally depend upon the amount of the dihydric reactants. Alternatively, the polysiloxane-polycarbonate copolymers may be prepared by co-reacting in a molten state, the dihydroxy monomers and a diaryl carbonate ester, such as diphenyl carbonate, in the presence of a transesterification catalyst as described above.

In the production of the polysiloxane-polycarbonate copolymer, the amount of dihydroxy polydiorganosiloxane is selected so as to provide an effective level of flame retardance to the thermoplastic composition. The amount of dihydroxy polydiorganosiloxane will therefore vary depending on desired level of flame retardancy, the value of D, and the type and relative amount of each component in the thermoplastic composition, including the type and amount of polycarbonate, type and amount of impact modifier, type and amount of polysiloxane-polycarbonate copolymer, and type and amount of other flame retardants. Suitable amounts of dihydroxy polydiorganosiloxane can be determined by one of ordinary skill in the art without undue experimentation using the guidelines taught herein. The amount of dihydroxy polydiorganosiloxane may be selected so as to produce a copolymer comprising about 0.1 to about 40 wt. %, for example, about 8 to about 40 wt. % of polydimethylsiloxane, or an equivalent molar amount of another polydiorganosiloxane. In one embodiment, the amount of dihydroxy polydiorganosiloxane may be selected to produce a copolymer comprising about 15 to about 30 wt. % of polydimethylsiloxane, or an equivalent molar amount of another polydiorganosiloxane. The amount of dimethylsiloxane units in the polysiloxane-polycarbonate copolymer may be determined by those of ordinary skill in the art using known methods. For example, the weight percent of dimethylsiloxane units in a compound of formula (8) may be determined by comparison of the integrated intensity of the aromatic protons to the protons on the siloxane chains in the $^1$H NMR spectra of a homogenous sample dissolved in $CDCl_3$ (without tetramethylsilane).

The polysiloxane-polycarbonate copolymers have a weight-average molecular weight (Mw, measured, for example, by gel permeation chromatography, ultra-centrifugation, or light scattering) of about 10,000 to about 200,000, preferably about 20,000 to about 100,000.

The polycarbonate composition may further include an impact modifier composition comprising a particular combination of impact modifiers to increase its impact resistance. Suitable impact modifiers may be an elastomer-modified graft copolymer comprising (i) an elastomeric (i.e., rubbery) polymer substrate having a Tg below 0° C., more specifically about −40° to −80° C., and (ii) a rigid polymeric superstrate grafted to the elastomeric polymer substrate. As is known, elastomer-modified graft copolymers may be prepared by first providing an elastomeric polymeric backbone. At least one grafting monomer, and preferably two, are then polymerized in the presence of the polymer backbone to obtain the graft copolymer.

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 to about 95 wt. % elastomer-modified graft copolymer and about 5 to about 65 wt. % graft (co)polymer, based on the total weight of the impact modifier. In another embodiment, such impact modifiers comprise about 50 to about 85 wt. %, more specifically about 75 to about 85 wt. % rubber-modified graft copolymer, together with about 15 to about 50 wt. %, more specifically about 15 to about 25 wt. % graft (co)polymer, based on the total weight of the impact modifier. The ungrafted rigid polymers or copolymers may also be separately prepared, for example by radical polymerization, in particular by emulsion, suspension, solution or bulk polymerization, and added to the impact modifier composition or polycarbonate composition. Such ungrafted rigid polymers or copolymers preferably have number average molecular weights of from 20,000 to 200,000.

Suitable materials for use as the elastomeric polymer backbone include, for example, conjugated diene rubbers; copolymers of a conjugated diene with less than about 50 wt. % of a copolymerizable monomer; $C_{1-8}$ alkyl (meth)acrylate elastomers; olefin rubbers such as ethylene propylene copolymers (EPR) or ethylene-propylene-diene monomers (EPDM); silicone rubbers; elastomeric $C_{1-8}$ alkyl (meth)acrylates; elastomeric copolymers of $C_{1-8}$ alkyl(meth)acrylates with butadiene and/or styrene; or combinations comprising at least one of the foregoing elastomers.

Suitable conjugated diene monomers for preparing the elastomer backbone are of formula (10):

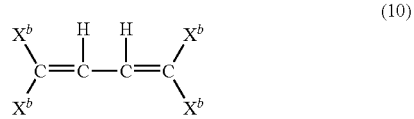

(10)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, and monomers of formula (11):

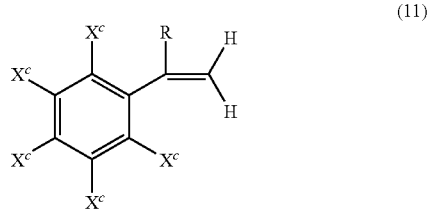

(11)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of the suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, combinations comprising at least one of the foregoing compounds, and the like. Styrene and/or alpha-methylstyrene are commonly used as monomers copolymerizable with the conjugated diene monomer. Mixtures of the foregoing monovinyl monomers and monovinylaromatic monomers may also be used.

Other monomers that may be copolymerized with the conjugated diene are monovinylic monomers such as itaconic acid, acrylamide, N-substituted acrylamide or methacrylamide, maleic anhydride, maleimide, N-alkyl, aryl or haloaryl substituted maleimide, glycidyl (meth)acrylates, and monomers of the general formula (12):

(12)

wherein R is as previously defined and $X^c$ is cyano, $C_1$-$C_{12}$ alkoxycarbonyl, $C_1$-$C_{12}$ aryloxycarbonyl, or the like. Examples of monomers of formula (12) include acrylonitrile, ethacrylonitrile, methacrylonitrile, alpha-chloroacrylonitrile, beta-chloroacrylonitrile, alpha-bromoacrylonitrile, methyl acrylate, methyl methacrylate, ethyl acrylate, n-butyl acrylate, n-butyl methacrylate, propyl acrylate, isopropyl acrylate, 2-ethylhexyl acrylate, combinations comprising at least one of the foregoing monomers, and the like. Monomers such as n-butyl acrylate, ethyl acrylate, and 2-ethylhexyl acrylate are commonly used as monomers copolymerizable with the conjugated diene monomer.

Suitable (meth)acrylate rubbers suitable for use as the elastomeric polymer backbone may be cross-linked, particulate emulsion homopolymers or copolymers of $C_{1-8}$ alkyl (meth)acrylates, in particular $C_{4-6}$ alkyl acrylates, optionally in admixture with up to 15 wt. % of comonomers such as styrene, methyl methacrylate, butadiene, isoprene, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl(meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomeric polymer substrate may be in the form of either a block or random copolymer. The particle size of the substrate is not critical, for example, an average particle size of 0.05 to 8 micrometers, more specifically 0.1 to 1.2 micrometers, still more specifically 0.2 to 0.8 micrometers, for emulsion based polymerized rubber lattices or 0.5 to 10 microns, preferably 0.6 to 1.5 microns, for mass polymerized rubber substrates which also have included grafted monomer occlusions. Particle size may be measured by simple light transmission methods or capillary hydrodynamic chromatography (CHDF). The rubber substrate may be a particulate, moderately cross-linked conjugated diene or $C_{4-6}$ alkyl acrylate rubber, and preferably has a gel content greater than 70%. Also suitable are mixtures of conjugated diene and $C_{4-6}$ alkyl acrylate rubbers.

In the preparation the elastomeric graft copolymer, the elastomeric polymer backbone may comprise about 40 to about 95 wt. % of the total graft copolymer, more specifically about 50 to about 85 wt. %, and even more specifically about 75 to about 85 wt. % of the elastomer-modified graft copolymer, the remainder being the rigid graft phase.

The elastomer-modified graft polymers may be polymerized by mass, emulsion, suspension, solution or combined processes such as bulk-suspension, emulsion-bulk, bulk-solution or other techniques, using continuous, semibatch, or batch processes.

In one embodiment, the elastomer-modified graft polymer may be obtained by graft polymerization of a mixture comprising a monovinylaromatic monomer and optionally one or more comonomers in the presence of one or more elastomeric polymer substrates. The above-described monovinylaromatic monomers may be used in the rigid graft phase, including styrene, alpha-methyl styrene, halostyrenes such as dibromostyrene, vinyltoluene, vinylxylene, butylstyrene, para-hydroxystyrene, methoxystyrene, or combinations comprising at least one of the foregoing monovinylaromatic monomers. The monovinylaromatic monomers may be used in combination with one or more comonomers, for example the above-described monovinylic monomers and/or monomers of the general formula (12). In one specific embodiment, the monovinylaromatic monomer is styrene or alpha-methyl styrene, and the comonomer is acrylonitrile, ethyl acrylate, and/or methyl methacrylate. In another specific embodiment, the rigid graft phase may be a copolymer of styrene and acrylonitrile, a copolymer of alpha-methylstyrene and acrylonitrile, or a methyl methacrylate homopolymer or copolymer. Specific examples of such elastomer-modified graft copolymers include but are not limited to acrylonitrile-butadiene-styrene (ABS), acrylonitrile-styrene-butyl acrylate (ASA), methyl methacrylate-acrylonitrile-butadiene-styrene (MABS), and methyl methacrylate-butadiene-styrene (MBS), and acrylonitrile-ethylene-propylene-diene-styrene (AES). Acrylonitrile-butadiene-styrene graft copolymers are well known in the art and many are commercially available, including, for example, the high-rubber acrylonitrile-butadiene-styrene resins available from General Electric Company as BLENDEX® grades 131, 336, 338, 360, and 415.

In another embodiment the impact modifier has a core-shell structure wherein the core is an elastomeric polymer substrate and the shell is a rigid thermoplastic polymer that is readily wet by the polycarbonate. The shell may merely physically encapsulate the core, or the shell may be partially or essentially completely grafted to the core. More specifically, the shell comprises the polymerization product of a monovinylaromatic compound and/or a monovinylic monomer or an alkyl(meth)acrylate.

An example of a suitable impact modifier of this type may be prepared by emulsion polymerization and is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate, or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. This emulsion polymerization process is described and disclosed in various patents and literature of such companies as Rohm & Haas and General Electric Company. In the practice, any of the above-described impact modifiers may be used providing it is free of the alkali metal salts of fatty acids, alkali metal carbonates, and other basic materials. A specific impact modifier of this type is an MBS impact modifier wherein the butadiene substrate is prepared using above-described sulfonates, sulfates, or phosphates as surfactants. It is also preferred that the impact modifier have a pH of about 3 to about 8, specifically about 4 to about 7.

Another specific type of elastomer-modified impact modifier composition comprises structural units derived from: at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched hydrocarbyl group and $R^e$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (11) or (12), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methacryloxypropyl)methyldimethoxysilane, to afford silicone rubber having an average particle size from about 100 nanometers to about 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

The thermoplastic composition may further comprise other thermoplastic polymers, for example the rigid polymers as described above without the elastomer modification, and/ or the elastomers as described above without the rigid polymeric grafts. Suitable rigid thermoplastic polymers generally have a Tg greater than about 0° C., preferably greater than about 20° C., and include, for example, polymers derived from monovinylaromatic monomers containing condensed aromatic ring structures, such as vinyl naphthalene, vinyl anthracene and the like, or monomers of formula (9), for example styrene and alpha-methyl styrene; monovinylic monomers such as itaconic acid, acrylamide, N-substituted acrylamide or methacrylamide, maleic anhydride, maleimide, N-alkyl, aryl or haloaryl substituted maleimide, glycidyl (meth)acrylates; and monomers of the general formula (12), for example acrylonitrile, methyl acrylate and methyl methacrylate; and copolymers of the foregoing, for example styrene-acrylonitrile (SAN), methyl methacrylate-acrylonitrile-styrene, and methyl methacrylate-styrene. These additional thermoplastic polymers may be present in amounts of up to about 50 wt. %, specifically about 1 to about 35 wt. %, more specifically about 10 to about 25 wt. %.

In addition to the foregoing components, the polycarbonate compositions further comprise a phosphorus containing flame retardant, for example an organic phosphates and/or an organic compound containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl) phosphate, ethyl diphenyl phosphate, 2-ethylhexyl di(p-tolyl)phosphate, bis (2-ethylhexyl)p-tolyl phosphate, tritolyl phosphate, bis(2-ethylhexyl) phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

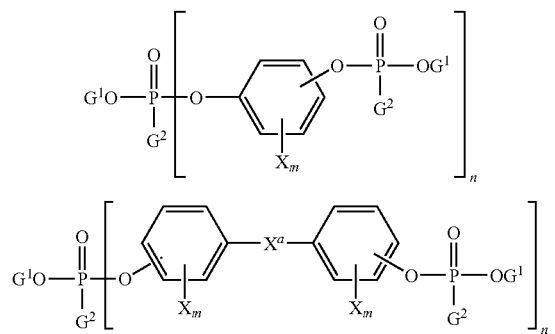

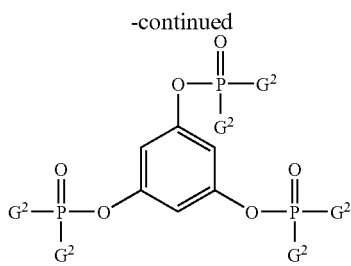

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m 0 to 4, and n is 1 to about 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A (BPADP), respectively, their oligomeric and polymeric counterparts, and the like. Methods for the preparation of the aforementioned di- or polyfunctional aromatic compounds are described in British Patent No. 2,043,083.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. The organic phosphorus-containing flame retardants are generally present in amounts of about 0.1 to about 20 parts by weight, for example, about 2 to about 18 parts by weight or about 4 to about 16 parts by weight, optionally about 2 to about 15 parts by weight, based on 100 parts by weight of the total composition, exclusive of any filler.

The thermoplastic composition may be essentially free of chlorine and bromine, particularly chlorine and bromine flame retardants. "Essentially free of chlorine and bromine" as used herein refers to materials produced without the intentional addition of chlorine, bromine, and/or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine may be defined as having a bromine and/or chlorine content of less than or equal to about 100 parts per million by weight (ppm), less than or equal to about 75 ppm, or less than or equal to about 50 ppm. When this definition is applied to the fire retardant it is based on the total weight of the fire retardant. When this definition is applied to the thermoplastic composition it is based on the total weight of polycarbonate, impact modifier and fire retardant.

Optionally, inorganic flame retardants may also be used, for example sulfonate salts such as potassium perfluorobutane sulfonate (Rimar salt) and potassium diphenylsulfone sulfonate; salts formed by reacting for example an alkali metal or alkaline earth metal (preferably lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, $BaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of about 0.01 to about 1.0 parts by weight, more specifically about 0.05 to about 0.5 parts by weight, based on 100 parts by weight of polycarbonate resin, impact modifier, polysiloxane-polycarbonate copolymer, and phosphorus-containing flame retardant.

Anti-drip agents may also be included in the composition, and may include, for example fluoropolymers, such as a fibril forming or non-fibril forming fluoropolymer such as fibril forming polytetrafluoroethylene (PTFE) or non-fibril forming polytetrafluoroethylene, or the like; encapsulated fluoropolymers, i.e., a fluoropolymer encapsulated in a polymer as the anti-drip agent, such as a styrene-acrylonitrile copolymer encapsulated PTFE (TSAN) or the like, or combinations comprising at least one of the foregoing anti-drip agents. An encapsulated fluoropolymer may be made by polymerizing the polymer in the presence of the fluoropolymer. TSAN may be made by copolymerizing styrene and acrylonitrile in the presence of an aqueous dispersion of PTFE. TSAN may provide significant advantages over PTFE, in that TSAN may be more readily dispersed in the composition. TSAN may, for example, comprise about 50 wt. % PTFE and about 50 wt. % styrene-acrylonitrile copolymer, based on the total weight of the encapsulated fluoropolymer. The styrene-acrylonitrile copolymer may, for example, be about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or a styrene-acrylonitrile resin as in, for example, U.S. Pat. Nos. 5,521,230 and 4,579,906 to form an agglomerated material for use as an anti-drip agent. Either method may be used to produce an encapsulated fluoropolymer. Anti-drip agents are generally used in amounts of about 0.1 to about 1.4 parts by weight, based on 100 parts by weight of based on 100 parts by weight of the total composition, exclusive of any filler.

In addition to the polycarbonate resin, the polycarbonate composition may include various additives ordinarily incorporated in resin compositions of this type. Mixtures of additives may be used. Such additives may be mixed at a suitable time during the mixing of the components for forming the composition.

Suitable fillers or reinforcing agents include, for example, $TiO_2$; fibers, such as asbestos, carbon fibers, or the like; silicates and silica powders, such as aluminum silicate (mullite), synthetic calcium silicate, zirconium silicate, fused silica, crystalline silica graphite, natural silica sand, or the like; boron powders such as boron-nitride powder, boron-silicate powders, or the like; alumina; magnesium oxide (magnesia); calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; glass fibers, (including continuous and chopped fibers), such as E, A, C, ECR, R, S, D, and NE glasses and quartz, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about 1 to about 50 parts by weight, based on 100 parts by weight of the total composition.

Suitable heat stabilizers include, for example, organo phosphites such as triphenyl phosphite, tris-(2,6-dimethylphenyl)phosphite, tris-(mixed mono-and di-nonylphenyl) phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 0.5 parts by weight based on 100 parts by weight of the total composition, excluding any filler.

Suitable antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 0.5 parts by weight, based on 100 parts by weight of the total composition, excluding any filler.

Suitable light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations comprising at least one of the foregoing light stabilizers. Light stabilizers are generally used in amounts of about 0.1 to about 1.0 parts by weight, based on 100 parts by weight of polycarbonate resin, impact modifier, polysiloxane-polycarbonate copolymer, and phosphorus containing flame retardant.

Suitable plasticizers include, for example, phthalic acid esters such as dioctyl-4,5-epoxy-hexahydrophthalate, tris-(octoxycarbonylethyl)isocyanurate, tristearin, epoxidized soybean oil or the like, or combinations comprising at least one of the foregoing plasticizers. Plasticizers are generally used in amounts of about 0.5 to about 3.0 parts by weight, based on 100 parts by weight of the total composition, excluding any filler.

Suitable antistatic agents include, for example, glycerol monostearate, sodium stearyl sulfonate, sodium dodecylbenzenesulfonate or the like, or combinations of the foregoing antistatic agents. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 0.1 to about 3.0 parts by weight based on 100 parts by weight the total composition, excluding any filler.

Suitable mold releasing agents include for example, stearyl stearate, pentaerythritol tetrastearate, beeswax, montan wax, paraffin wax, or the like, or combinations comprising at least one of the foregoing mold release agents. Mold releasing agents are generally used in amounts of about 0.1 to about 1.0 parts by weight, based on 100 parts by weight of the total composition, excluding any filler.

Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB 5411); 2-hydroxy-4-n-octyloxybenzophenone (CYASORB 531); 2-[4,6-bis(2,4-dimethylphenyl)-1,3,5-triazin-2-yl]-5-(octyloxy)-phenol (CYASORB 1164); 2,2'-(1,4-phenylene)bis(4H-3,1-benzoxazin-4-one) (CYASORB UV-3638); 1,3-bis[(2-cyano-3,3-diphenylacryloyl)oxy]-2,2-bis[[(2-cyano-3,3-diphenylacryloyl)oxy]methyl]propane (UVINUL 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.01 to about 3.0 parts by weight, based on 100 parts by weight based on 100 parts by weight of polycarbonate resin, impact modifier, polysiloxane-polycarbonate copolymer, and phosphorus containing flame retardant.

Suitable lubricants include for example, fatty acid esters such as alkyl stearyl esters, e.g., methyl stearate or the like; mixtures of methyl stearate and hydrophilic and hydrophobic surfactants comprising polyethylene glycol polymers, polypropylene glycol polymers, and copolymers thereof e.g., methyl stearate and polyethylene-polypropylene glycol copolymers in a suitable solvent; or combinations comprising at least one of the foregoing lubricants. Lubricants are generally used in amounts of about 0.1 to about 5 parts by weight, based on 100 parts by weight of the total composition, excluding any filler.

Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates; sulfates and chromates; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 1 to about 10 parts by weight, based on 100 parts by weight based on 100 parts by weight of the total composition, excluding any filler.

Suitable dyes include, for example, organic dyes such as coumarin 460 (blue), coumarin 6 (green), nile red or the like; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly(2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes such as 5-amino-9-diethyliminobenzo(a)phenoxazonium perchlorate; 7-amino-4-methylcarbostyryl; 7-amino-4-methylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-diethylamino-4-methylcoumarin; 7-diethylamino-4-trifluoromethylcoumarin; 2,2'-dimethyl-p-quaterphenyl; 2,2-dimethyl-p-terphenyl; 7-ethylamino-6-methyl-4-trifluoromethylcoumarin; 7-ethylamino-4-trifluoromethylcoumarin; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene or the like, or combinations comprising at least one of the foregoing dyes. Dyes are generally used in amounts of about 0.1 to about 5 parts by weight, based on 100 parts by weight of the total composition, excluding any filler.

Suitable colorants include, for example titanium dioxide, anthraquinones, perylenes, perinones, indanthrones, quinacridones, xanthenes, oxazines, oxazolines, thioxanthenes, indigoids, thioindigoids, naphthalimides, cyanines, xanthenes, methines, lactones, coumarins, bis-benzoxazolylthiophene (BBOT), napthalenetetracarboxylic derivatives, monoazo and disazo pigments, triarylmethanes, aminoketones, bis(styryl)biphenyl derivatives, and the like, as well as combinations comprising at least one of the foregoing colorants. Colorants are generally used in amounts of about 0.1 to about 5 parts by weight, based on 100 parts by weight of the total composition, excluding any filler.

Suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4'oxybis(benzenesulfonylhydrazide), sodium bicarbonate, ammonium carbonate, or the like, or combinations comprising at least one of the foregoing blowing agents. Blowing agents are generally used in amounts of about 1 to about 20 parts by weight, based on 100 parts by weight of the total composition, excluding any filler.

The thermoplastic compositions can be manufactured by methods known in the art, for example in one embodiment, in one manner of proceeding, powdered polycarbonate resin, impact modifier, polydiorganosiloxane-polycarbonate copolymer, and/or other optional components are first blended, optionally with chopped glass strands or other filler in a Henschel high speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets so prepared when cutting the extrudate may be one-fourth inch long or less as desired. Such pellets may be used for subsequent molding, shaping, or forming.

As noted above, it is particularly challenging to achieve excellent flame retardancy while not adversely affecting the desirable physical properties of the compositions, in particular impact strength. It has been found by the inventors hereof that flame retardant compositions having good physical properties and excellent flame retardance in the absence of a brominated or chlorinated flame retardant are obtained by careful balancing of the relative amounts of the above-described polycarbonates, impact modifiers, polysiloxane-polycarbonate copolymers, and organic phosphorus-containing flame retardants. In particular, in one embodiment, the thermoplastic composition comprises about 20 to about 90 wt. % of the polycarbonate resin; about 1 to about 35 wt. % of the impact modifier (when present); about 0.5 to about 30 wt. % of the polysiloxane-polycarbonate copolymer; and about 0.1 to about 20 wt. % of an organic phosphorus containing flame retarding agent, each based on the total combined weight of the composition, excluding any filler or other additive. Amounts outside of these ranges result in compositions that have one or more of decreased flame retardance; i.e., increased flame out time (FOT) or decreased probability for passing, and/or decreased time to drip.

In various embodiments, samples of compositions described herein having a thickness of 0.1 mm to 2.0 mm±10%, e.g., 1.5 mm±10% or 1.2 mm±10% achieve a UL94 5VB rating in the absence of a brominated and/or chlorinated flame retardant. In some embodiments, a sample of the thermoplastic composition having a thickness of 2.0 mm±10% to 0.1 mm±10%, when exposed to an open flame, has a flame out time of less than 30 seconds in the absence of a brominated and/or chlorinated flame retardant, optionally without dripping. Underwriters Laboratories performs a periodic audit of every polymer composition or grade which bears a UL flame rating. A diagram of the UL Audit/Follow-up Services process is shown in FIG. 1. During an audit, five specimens of a polymer composition are tested initially.

A retest of five additional specimens is allowed under certain conditions amounting to a "near miss," that is, a single specimen does not meet a single requirement for a pass rating. Specifically, these conditions are: a single burn time exceeds the maximum burn time value (V-0, 10 seconds; V-1, V-2, 30 seconds); or a sum of individual burn times is greater than the maximum total burn time allowed (V-0, 50 seconds; V-1, V-2 250 seconds) and is less than or equal to the maximum retest total burn time value (V-0, 55 seconds, V-1, V-2, 255 seconds); or a single specimen exhibits dripping during the test.

Where a single specimen of a polymer composition fails to meet any one of these conditions, a retest of a second set of specimens is allowed. The polymer composition may pass the flame test on a retest; the requirements listed in Table 1 are applied to retest data. If a single specimen or the set of specimens fails to meet more than one condition, no retest is allowed and a first submittal failure occurs.

TABLE 1

Vertical Flame Class Requirements

|  | 94V-0 | 94V-1 | 94V-2 |
|---|---|---|---|
| Individual burn time, seconds | 10 | 30 | 30 |
| Total burn time, s (5 specimens × 2) | 50 | 250 | 250 |
| Glowing time, s (individual specimen) | 30 | 60 | 60 |
| Drip particles that ignite cotton | NO | NO | YES |

Because the consequences of failing an audit are extremely serious, UL Follow-up Services provides for submittal of a second set of samples. On a second submittal, the second set of specimens is tested exactly as a first set. Five specimens are tested initially, with five additional specimens retested if the conditions are met under which a retest is allowed (described above). The polymer composition may pass the flame test on a second submittal, either on testing the initial five specimens or on a retest. The requirements listed in Table 1 are applied to second submittal data.

Therefore, the data obtained from the UL-94 flame test may be in the form of burn times for first and possibly second applications of a flame to a single specimen, for first submission specimens tested initially and retested, and for second submission specimens tested initially and retested. Data relating to dripping of the various specimens may also be considered. A statistical analysis of data obtained from a flame tests on a number of samples (e.g., 20 or more) can be used to determine the probability of at least one possible outcome of the UL test regimen. Possible outcomes include a first submittal pass, including first time pass and retest, and a second submittal pass, including first time pass and retest, and failure. The probability of at least one outcome, preferably a first time pass on a first submission, provides a measure of the flame retardance of the polymer composition, while minimizing the variability inherent in flame testing, particularly the UL-94 test.

Figure 2:
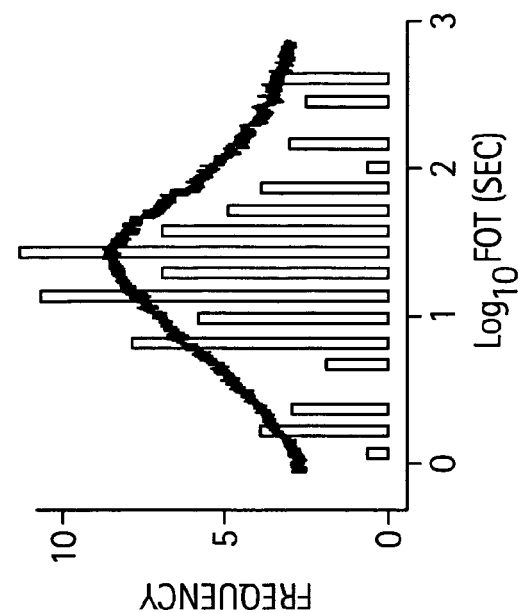
FIG. 2 shows a distribution curve for burn time data obtained from a typical UL-94 flame test, in comparison with a distribution curve for a logarithmic transformation of the data.
Figure 2:
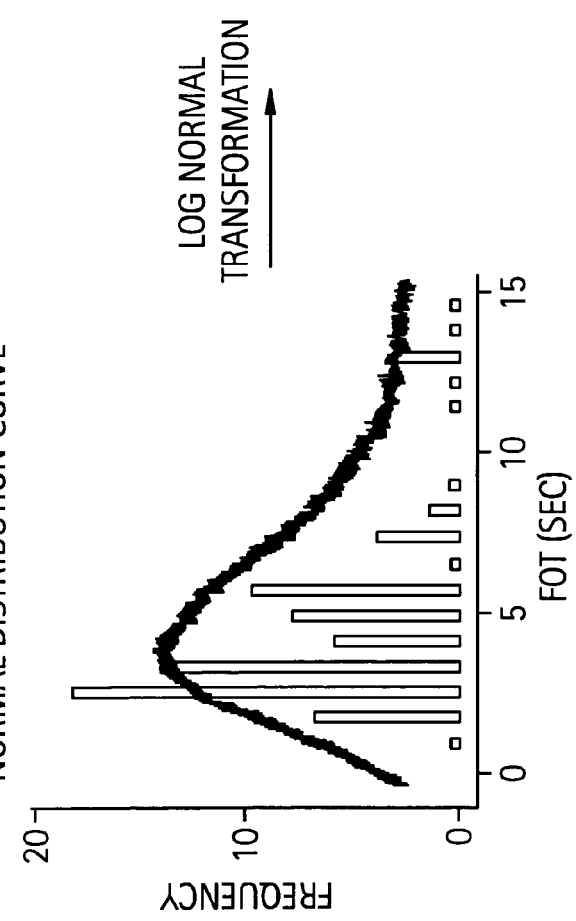

The raw data may be transformed prior to use in the statistical calculations by conversion to equivalent logarithmic values. ("Logarithm" and "logarithmic" refer to base 10 logarithms.) Times less than one second may be rounded up to one second in order to avoid negative logarithmic values. The logarithm of the burn time may then be calculated and used in subsequent steps. Use of transformed data is preferred as a more normal distribution of values associated with burn time is thereby provided, as shown in FIG. 2. Raw data do not show a normal (bell-shaped) distribution curve because there can be no values less than zero, and data points are typically clustered in the space below the maximum individual burn time. The transformed data, however, more closely fit a normal distribution curve, as shown in FIG. 2.

The probability of a first time pass on a first submission (pFTP) may be determined according to the formula:

$$pFTP = (P_{t1>mbt,\ n=0} \times P_{t2>mbt,\ n=0} \times P_{total<=mbt} \times P_{drip,\ n=0})$$

where $P_{t1>mbt,\ n=0}$ is the probability that no first burn time exceeds a maximum burn time value, $P_{t2>mbt,\ n=0}$ is the probability that no second burn time exceeds a maximum burn time value, $P_{total<=mbt}$ is the probability that the sum of the burn times is less than or equal to a maximum total burn time value, and $P_{drip,\ n=0}$ is the probability that no specimen exhibits dripping during the flame test. First and second burn time refer to burn times after a first and second application of the flame, respectively.

The probability that no first burn time exceeds a maximum burn time value, $P_{t1>mbt,\ n=0}$, may be determined from the formula:

$$P_{t1>mbt,\ n=0} = (1 - P_{t1>mbt})^5$$

where $P_{t1>mbt}$ is the area under the log normal distribution curve for t1>mbt, and where the exponent "5" relates to the number of bars tested.

The probability that no second burn time exceeds a maximum burn time value may be determined from the formula:

$$P_{t2>mbt,\ n=0} = (1 - P_{t2>mbt})^5$$

where $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating the maximum burn time is 30 seconds.

The probability $P_{drip,\ n=0}$ that no specimen exhibits dripping during the flame test is an attribute function, estimated by:

$$(1 - P_{drip})^5$$

where $P_{drip}$ = (the number of bars that drip/the number of bars tested).

The probability $P_{total<=mbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mbt}$ may be determined from the area under a log normal distribution curve of a set of 1000 Monte Carlo simulated 5-bar total burn time for total<=maximum total burn time. For the UL-94 V-0 rating, the maximum total burn time is 50 seconds. For a V-1 or V-2 rating, the maximum total burn time is 250 seconds.

In particular embodiments, the composition has a flame out time of less than 10 seconds, optionally with a probability of first time pass (pFTP) of at least 0.85, the absence of a brominated and/or chlorinated flame retardant.

In still other embodiments, a one-eighth inch (3.18 mm) (+3%) bar comprising the composition has a notched Izod impact strength of at least about 3.6 ft-lb/inch determined in accordance with ASTM D256 at room temperature, optionally greater than about 5.6 ft-lb/inch, e.g., greater than or equal to about 6 ft-lb/inch.

A sample composition as described herein having a thickness of 2.5 mm (±10%) may achieve a UL94 5VA rating in the absence of a brominated and/or chlorinated flame retardant. In other embodiments, a one-eighth inch (3.18 mm) (+3%) bar comprising the composition has a notched Izod impact strength of at least about 3.6 ft-lb/inch determined in accordance with ASTM D256 at room temperature.

In another embodiment, the thermoplastic composition comprises about 40 to about 80 wt. % of the polycarbonate resin; about 2 to about 15 wt. % of the impact modifier; more than 5 wt. % of the polysiloxane-polycarbonate copolymer, e.g., about 10 to about 25 wt. %. Optionally, the composition may comprise 2 to 15 wt. % of an organic phosphorus containing flame retarding agent, e.g., about 8 to 15 wt. %, based on the total combined weight of the composition, excluding any filler. These amounts provide optimal flame retardance, together with good notched Izod impact strength at ambient temperature; good notched Izod impact strength at low temperature; and/or good heat deflection temperature. In addition, these amounts provide compositions that meet UL94 5VB, V0/V1 test requirements and that meet other criteria such as minimum time to drip, as described herein. Relative amounts of each component and their respective composition may be determined by methods known to those of ordinary skill in the art, for example, proton nuclear magnetic resonance spectroscopy ($^1$H NMR), "$^{13}$C NMR, X-ray fluorescence, high resolution mass spectroscopy, Fourier transform infrared spectroscopy, gas chromatography-mass spectroscopy, and the like.

In one embodiment, the thermoplastic compositions are of particular utility in the manufacture flame retardant articles that pass the UL94 vertical burn tests, in particular the UL94 5VB standard. In the UL94 vertical burn test, a flame is applied to a vertically fastened test specimen placed above a cotton wool pad. To achieve a rating of 5VB, burning must stop within 60 seconds after five applications of a flame to a test bar, and there can be no drips that ignite the pad. Various embodiments of the compositions described herein meet the UL94 5VB standard.

Thin articles present a particular challenge in the UL 94 tests, because compositions suitable for the manufacture of thin articles tend to have a higher flow. Thermoplastic compositions suitable for the manufacture of a variety of articles will generally have a melt volume rate (MVR) of about 4 to about 30 g/10 minutes measured at 260° C./2.16 kg in accordance with ASTM D1238. Within this range, for thin wall applications, the MVR may be adjusted to greater than about 8, preferably greater than about 10, more preferably greater than about 13 g/10 minutes, measured at 260° C./2.16 kg in accordance with ASTM D1238.

Melt viscosity can provide an alternative indication flow. Thermoplastic compositions as described herein suitable for the manufacture of thin articles may have a melt viscosity at 260° C./1500 sec$^{-1}$ of about 50 to about 500 Pascal-second, measured in accordance with ISO 11443. In some embodiments, the compositions meet the UL V2 criterion.

Flame retardance of the samples is excellent. It has been found that in one embodiment, samples having a thicknesses of 1.2 and 2.0 mm (±10%) pass the UL94 5VB standard. In addition, samples having thicknesses of 1.2 mm or 1.5 mm perform well in a time to drip test.

The thermoplastic compositions may further have a heat deflection temperature (HDT) about 65° C. to about 110° C., specifically about 70° C. to about 105° C., measured according to ISO 75/Ae at 1.8 MPa using 4 mm (±3%) thick testing bar.

The thermoplastic compositions may further have a Notched Izod Impact (NoI) strength of about 3 to about 18 ft-lb/inch, or about 3 to about 14 ft-lb/inch, measured at room temperature using ⅛-inch (3.18 mm) (±3%) bars in accordance with ASTM D256.

The thermoplastic compositions may further have a Notched Izod Impact (NU) strength of about 6 to about 18 ft-lb/inch, or about 6 to about 14 ft-lb/inch, measured at 10° C. using ⅛-inch (3.18 mm) (±3%) bars in accordance with ASTM D256.

Shaped, formed, or molded articles comprising the thermoplastic compositions are also provided. The thermoplastic compositions can be molded into useful shaped articles by a variety of means such as injection molding, extrusion, rotational molding, blow molding and thermoforming to form articles such as, for example, computer and business machine housings such as housings for monitors, hand held electronic device housings such as housings for cell phones, electrical connectors, and components of lighting fixtures, ornaments, home appliances, roofs, greenhouses, sun rooms, swimming pool enclosures, and the like. The above-described compositions are of particular utility in the manufacture of articles comprising a minimum wall thickness of as low as about 0.1 mm, 0.5 mm, 1.0 mm, or 2.0 mm (about indicating ±10%). The above-described compositions are also of particular utility in the manufacture of articles comprising a minimum wall thickness of about 3 mm or less, e.g., about 0.1 mm to about 2 mm, e.g., about 1.2 mm to about 2 mm, or about 0.2 mm to about 1.8 mm or, more specifically, about 0.6 mm to about 1.5 mm or about 0.8 mm to about 1.2 mm.

The present invention is further illustrated by the following non-limiting examples. The following components were used:

TABLE 2

| Component | Type | Source |
|---|---|---|
| PC-1 | BPA polycarbonate resin made by a melt process with an MVR at 300° C./1.2 kg, of 23.5-28.5 g/10 min | GE Plastics |
| PC-2 | BPA polycarbonate resin made by a melt process with an MVR at 300° C./1.2 kg, of 5.1-6.9 g/10 min | GE Plastics |
| PC-ST-1 | Polysiloxane-polycarbonate copolymer comprising units derived from BPA and units derived from formula (10), wherein n is 0, R$^2$ is propylene, R is methyl, D has an average value of about 50, the copolymer having an absolute weight average molecular weight of about 30000 g/mol, and a dimethylsiloxane content of about 20 wt. % | GE Plastics |

TABLE 2-continued

| Component | Type | Source |
|---|---|---|
| ABS-2 | Bulk polymerized ABS comprising 16% rubber and the balance styrene/acrylonitrile | GE Plastics |
| BPA-DP | Bisphenol A bis(diphenylphosphate) | NcendX P-30 |

In particular embodiments, the components shown in Table 2 (parts by weight) and, in addition, 0.5 wt. % of a mold release agent and 0.25 wt. % of a combination of an antioxidant and a light stabilizer, were blended to yield sample compositions in a Werner & Pfleiderer co-rotating twin screw extruder (25 millimeter screw) using a melt temperature range of about 260-280° C., and subsequently molded at a temperature of 244° C. for impact and heat distortion temperature testing according to ASTM standards 256 and 648 respectively on a Van Dorn 85HT injection molding machine. Bars for flame testing were injection molded at a temperature of 244° C. on a Husky injection molding machine.

Flammability tests were performed following the procedure of Underwriter's Laboratory Bulletin 94 entitled "Tests for Flammability of Plastic Materials, UL94." According to this procedure, materials may be classified as HB, V0, UL94 V1, V2, 5VA, and/or 5VB on the basis of the test results obtained for five samples. The criteria for each of these flammability classifications are described below and elsewhere herein.

V0: In a sample placed so that its long axis is 180 degrees to the flame, the period of flaming and/or smoldering after removing the igniting flame does not exceed ten seconds and the vertically placed sample produces no drips of burning particles that ignite absorbent cotton.

V1: In a sample placed so that its long axis is 180 degrees to the flame, the period of flaming and/or smoldering after removing the igniting flame does not exceed thirty seconds and the vertically placed sample produces no drips of burning particles that ignite absorbent cotton.

V2: In a sample placed so that its long axis is 180 degrees to the flame, the average period of flaming and/or smoldering after removing the igniting flame does not exceed twenty-five seconds, but the vertically placed samples produce drips of burning particles that ignite cotton. Five bar flame out time is the sum of the flame out time for five bars, each lit twice for a maximum flame out time of 250 seconds.

5VB: a flame is applied to a vertically fastened, 5-inch (127 mm) by 0.5-inch (12.7 mm) test bar of a given thickness above a dry, absorbent cotton pad located 12 inches (305 mm) below the bar. The thickness of the test bar is determined by calipers with 0.1 mm accuracy. The flame is a 5-inch (127 mm) flame with an inner blue cone of 1.58 inches (40 mm). The flame is applied to the test bar for 5 seconds so that the tip of the blue cone touches the lower corner of the specimen. The flame is then removed for 5 seconds. Application and removal of the flame is repeated for until the specimen has had five applications of the same flame. After the fifth application of the flame is removed, a timer (T-0) is started and the time that the specimen continues to flame (after-flame time), as well as any time the specimen continues to glow after the after-flame goes out (after-glow time), is measured by stopping T-0 when the after-flame stops, unless there is an after-glow and then T-0 is stopped when the after-glow stops. The combined after-flame and after-glow time must be less than or equal to 60 seconds after five applications of a flame to a test bar, and there may be no drips that ignite the cotton pad. The test is repeated on 5 identical bar specimens. If there is a single specimen of the five does not comply with the time and/or no-drip requirements then a second set of 5 specimens are tested in the same fashion. All of the specimens in the second set of 5 specimens must comply with the requirements in order for material in the given thickness to achieve the 5VB standard.

Time to drip: The time to drip is determined by alternately applying and removing a flame as described for the 5VB test in consecutive 5-second intervals, until the first drip of material falls from the bar. A time to drip characteristic of 55 seconds (s) or greater has been found to correlate well with other desired characteristics such as 5VB ratings.

NII was determined on one-eighth inch (3.18 mm) bars per ASTM D256 at room temperature (23° C.).

Table 3 shows the UL94 flame performance using the vertical burning 5VB procedure, time to drip, and V-0/V-1 procedure for bars of various diameters. The 5VB data represent the average of the flame out times for each of ten bars for each sample composition. The polycarbonate indicated in Table 3 is a 50/50 wt. % blend of the PC-1 and PC-2 of Table 2. Flame out time (FOT) indicated in Table 3 for V0 and V1 tests is average from trials on each of twenty bars for each sample composition, and the probability of each sample passing on the first test (pFTP (probability of first time pass)).

TABLE 3

| Components | \multicolumn{11}{c}{Sample no.} | | | | | | | | | | |
|---|---|---|---|---|---|---|---|---|---|---|---|
| | 1 | 2 | 3 | 4 | 5 | 6 | 7 | 8 | 9 | 10 | 11 |
| Polycarbonate | 73 | 53 | 73 | 63 | 53 | 70 | 65 | 50 | 89 | 69 | 69 |
| PC-ST-1 | 5 | 25 | 5 | 15 | 25 | 5 | 10 | 25 | 5 | 25 | 18 |
| ABS-2 | 10 | 10 | 10 | 10 | 10 | 9 | 9 | 9 | 2 | 2 | 2 |
| BPADP | 12 | 12 | 12 | 12 | 12 | 16 | 16 | 16 | 4 | 4 | 10 |
| TSAN | 0.5 | 0.5 | 1 | 1 | 1 | 1 | 1 | 1 | 1 | 1 | 1 |
| \multicolumn{12}{c}{Properties} | | | | | | | | | | | |
| "MVR, cm³/10 min" | 17 | 13 | 15 | 10 | 9.3 | 26 | 21 | 17 | 7.7 | 4.7 | 17.2 |
| "HDT, ° C." | 84.7 | 81.1 | 85 | 83.3 | 81.1 | 76.6 | 76.1 | 73 | 107.7 | 105.1 | 87.1 |
| "NII, 23° C., ft-lb/in" | 5.6 | 11.7 | 5.6 | 11.5 | 16.8 | 3.5 | 6.1 | 11.5 | 11.2 | 19.2 | 14.7 |
| \multicolumn{12}{c}{5 VB (Flame Out Time) Tests and Time To Drip test at indicated sample thickness} | | | | | | | | | | | |
| FOT-2 mm | 7 | 5.9 | 7.5 | 11.4 | 5.8 | 2.7 | 4.1 | 2.75 | 10 | 4 | — |
| TTD-2 mm | 55 | 71 | 61 | 73 | 84 | 71 | 77 | 96 | 52 | 87 | — |
| FOT-1.5 mm | 8.6 | 5.9 | 10.8 | 9.3 | 5.8 | 5.1 | 5.2 | 3.26 | 11 | 5 | — |
| TTD-1.5 mm | 27 | 57 | 47 | 74 | 77 | 41 | 61 | 75 | 47.3 | 83 | — |
| FOT-1.2 mm | 21 | 14 | 11 | 8.9 | 7.4 | 4.9 | 4.4 | 3.22 | 21 | 14 | — |
| TTD-1.2 mm | 42 | 52 | 43 | 52 | 57 | 47 | 60 | 67 | 41 | 51 | — |
| \multicolumn{12}{c}{V0/V1 Flame out Time (FOT) Tests at indicated sample thickness (average of twenty tests on twenty bars, with probability of first time pass (pFTP))} | | | | | | | | | | | |
| FOT-1.5 mm | 1.67 | 1.43 | 2.5 | 3.3 | 1.8 | 0.8 | 1.1 | 0.8 | 3.4 | 1.1 | — |
| pFTP-1.5 mm (V0) | 0.77 | 0.91 | 0.64 | 0.6 | 0.9 | 0.97 | 0.9 | 1 | 0.45 | 0.94 | — |
| pFTP-1.5 mm (V1) | 1 | 1 | 1 | 0.99 | 1 | 1 | 1 | 1 | 0.71 | 0.99 | — |
| FOT-1.0 mm | 3.06 | 2.4 | 3.9 | 6.1 | 2.7 | 1.5 | 2.2 | 1.1 | 7 | 3.4 | — |
| pFTP-1.0 mm (V0) | 0.84 | 0.95 | 0.7 | 0.6 | 0.9 | 1 | 0.93 | 1 | 0.42 | 0.93 | — |
| pFTP-1.0 mm (V1) | 0.76 | 0.89 | 0.71 | 0.6 | 0.86 | 1 | 0.91 | 1 | 0.52 | 0.9 | — |
| FOT-0.8 mm | 8.3 | 8.5 | 8.2 | 9.84 | 8.5 | 3.4 | 3.9 | 3.1 | 11 | 9.2 | 2.3 |
| pFTP-0.8 mm (V0) | 0.4 | 0.43 | 0.5 | 0.57 | 0.64 | 0.75 | 0.79 | 0.89 | 0.22 | 0.36 | 0.97 |
| pFTP-0.8 mm (V1) | 0.43 | 0.6 | 0.49 | 0.46 | 0.85 | 0.59 | 0.53 | 0.99 | 0.4 | 0.52 | 1 |
| FOT-0.5 mm | — | — | — | — | — | — | — | — | — | — | 2.8 |
| pFTP-0.5 mm (V1) | — | — | — | — | — | — | — | — | — | — | 1 |
| FOT-0.2 mm | — | — | — | — | — | — | — | — | — | — | 4.3 |

Legend:
FOT - Flame out time (V0 - <10s; V1 - <30 s; 5 VB - <60s)
TTD - Time-to-drip (>55 s required)

Flame retardance was also analyzed by calculation of the average flame out time, standard deviation of the flame out time, as the total number of drips, and using statistical methods to convert that data to a prediction of the probability of first time pass, or "pFTP", that a particular sample formulation would achieve a V0 "pass" rating in the conventional UL94 testing of 5 bars. Preferably pFTP will be as close to 1 as possible, for example greater than 0.9 and more preferably greater than 0.95, for maximum flame-retardant performance in UL testing. A pFTP of 0.85 or greater is deemed to be successful.

HDT was determined using a 4 mm thick (+10%) bar per ISO 75/Ae at 1.8 MPa.

MVR was determined at 260° C. using a 2.16 kilogram load per ASTM D1238.

Figure 3:
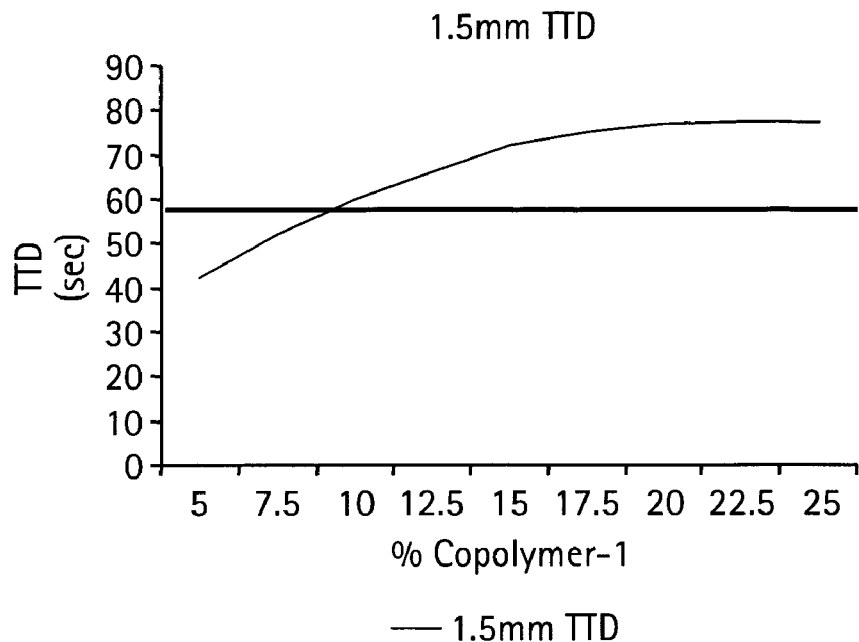
FIG. 3 is a graph showing a relationship between time to drip performance and the content of polysiloxane-polycarbonate copolymer in compositions as described herein.

The data of Table 3 reveals that compositions described herein achieve different performance standards through different ranges of proportions of ingredients. For example, a review of the data pertaining to the time to drip test shows that adequate performance can be achieved in samples 2mm thick with only a minor proportion, e.g., 0.5 to 1 wt. % of the composition, polysiloxane-polycarbonate copolymer with the use of an anti-drip additive (TSAN) as evidenced by samples 1, 3 and 6, but increased amounts of TSAN do not lead to adequate performance of thinner samples. The data of Table 3 shows, however, that good time to drip performance for samples thinner than 2 mm can be attained by including greater proportions of polysiloxane-polycarbonate copolymer in the composition. FIG. 3 represents the results of Table 3 in this regard for samples comprising 10.5 wt. % ABS-2 impact modifier, 10 wt. % BPADP and 1 wt. % TSAN for UL 5VB testing of 1.5 mm diameter samples, and shows a generally direct correlation between time to drip performance and the proportion of polysiloxane-polycarbonate copolymer in the composition, i.e., that time to drip performance of samples thinner than 2 mm improves as the proportion of polysiloxane-polycarbonate copolymer increases. The data indicate that preferred results (time to drip of 55 seconds or greater) will be attained with at least about 7.5 wt. % the copolymer. FIG. 3 also shows that the improvement in time to drip tapers off as the proportion of polysiloxane-polycarbonate copolymer increases, so that little appreciable improvement is seen when the proportion of the copolymer is about 17.5 wt. % of the composition, or greater.

Figure 4:
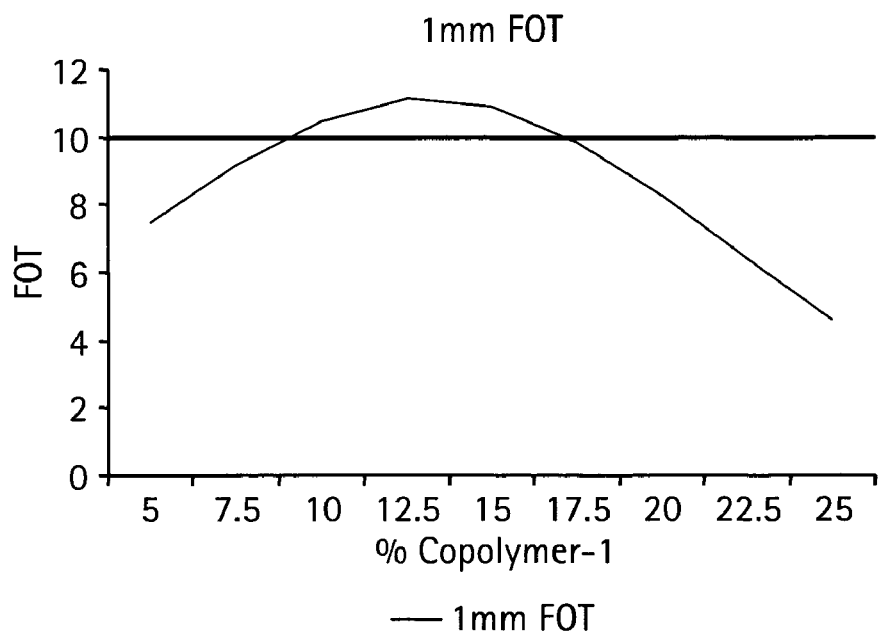
FIG. 4 is a graph showing a relationship between flame out time performance and the content of polysiloxane-polycarbonate copolymer in compositions as described herein.

The data of Table 3 also shows that the effect of the proportion of polysiloxane-polycarbonate copolymer copolymer in the composition does not have a direct correlation with improved performance for purposes of V0 testing, i.e., flame out time. Rather, as represented in FIG. 4, the data for tests of samples of 1 mm diameter comprising the same proportions of ABS-2, BPADP and TSAN as the materials used for FIG. 3 indicates that flame out time is at a maximum when polysiloxane-polycarbonate copolymer comprises about 12.5 wt. % of the composition and that either greater or lesser proportions of the copolymer give better results (see, e.g., samples 3, 4 and 5). Preferred flame out times, i.e., less than 10 seconds for V0 and, optionally, a probability of passing on the first test 0.85 or better, are attained when the composition comprises less than or equal to about 10.5 wt. % (see, e.g., sample 7), e.g., from about 7.5 to about 10.5 wt. %, but more than about 17.5 wt. % of the copolymer, e.g., from about 17.5 to about 25 wt. % (see, e.g., samples 2, 5, 8, 10 and 11).

In still other embodiments, a combination of time to drip of at least 55 seconds, flame out time of 60 seconds or less, optionally 30 seconds or less, e.g., 10 seconds or less, and Notched Izod Impact (NII) performance of at least 3.6 ft-lb/in are desired, as attained by samples 2, 4, 5, 8 and 10.

Figure 5:
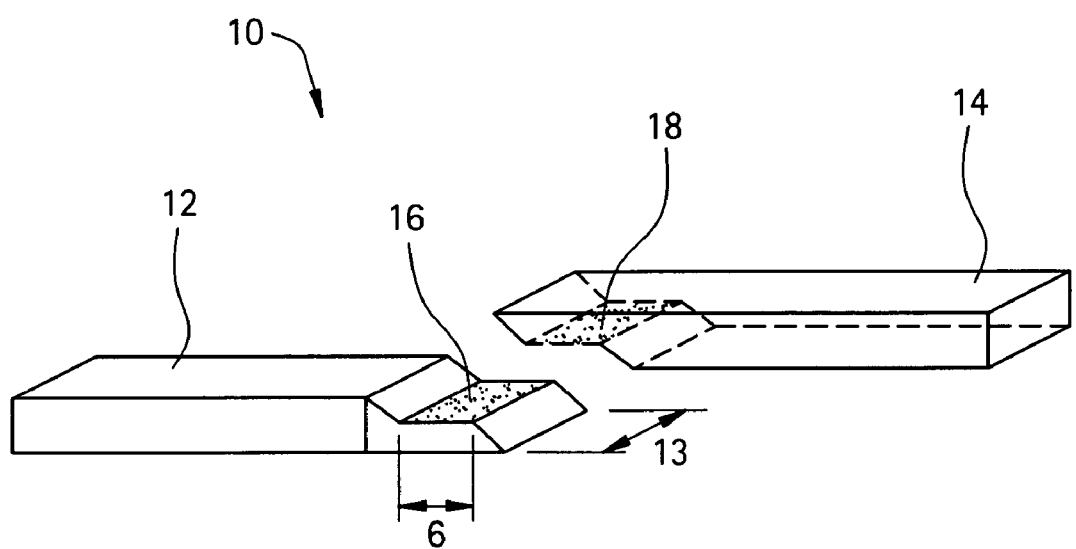
FIG. 5 is an exploded schematic perspective view of a test article comprising parts ultrasonically welded together.

In some embodiments, desirable flame out time performance is achieved irrespective of flame out time; for other embodiments, time to drip performance is attained irrespective of flame out time. In certain other embodiments, both flame out time and time to drip performance may be attained. The data of Table 3 indicates that embodiments that comprise about 7.5 to about 10.5 wt. % polysiloxane-polycarbonate copolymer by weight can attain good performance for both flame out time and time to drip. In another example, a composition comprising polycarbonate, polycarbonate-polysiloxane copolymer and an impact modifier as described herein (designated sample 12) was tested with respect to ultrasonic welding, with two comparative compositions designated C-1 and C-2. The compositions were tested for melt viscosity, HDT and NII. In addition, the compositions were molded into test parts suitable for being joined by ultrasonic welding to form a rectangular test article, as shown in the FIG. 5. Specifically, each test article 10 comprised two parts 12, 14 designed to fit together at mutually facing, longitudinally-aligned weld surfaces 16, 18 measuring 6 mm×13 mm to form a test article measuring 240 mm(l)×12.7 mm(w)×6 mm(t). The parts were welded together using a Branson 400 series Ultrasonic Welding Machine under the following conditions: frequency: 20 kHz (fix); pressure: 25 PSIG; weld time: 0.5 sec; hold time: 0.5 sec; booster amplitude 1:1 (standard); horn diameter 1.5 mm, flat face. The strength of the welds were tested on a Shimazu Universal Testing machine in which the ends of the test article were pulled apart at 5 mm/min. The load at failure of the weld was noted. Flammability tests were performed as well. The contents of the tested components and the test results are set forth in the following Table 4:

TABLE 4

| Components | C-1* | C-2* | 12 |
|---|---|---|---|
| Polycarbonate | 99.09 | 86.03 | 71.54 |
| Copolymer-1 | | | 14 |
| ABS-2 | | | 3 |
| MBS (Alkylmethacrylate-butadiene copolymer) | | 3.98 | |
| BPADP | | 8.97 | 10 |
| PETS | 0.35 | 0.3 | 0.3 |
| Hindered Phenol AO | | | 0.08 |
| Phosphite Stabilizer | | 0.05 | 0.08 |
| KSS (Potassium perfluorobutane sulfonate) | 0.06 | | |
| TSAN | 0.5 | 0.67 | 1 |
| Properties | | | |
| Ultrasonic weld load (kgf) | 78 | 117 | 140 |
| MVR, cm$^3$/10 min | 9 | 23 | 21 |
| HDT, °C. | 127 | 93 | 89 |
| NII, 23° C., ft-lb/in | 15 | 11 | 13 |
| V0/V1/V2 | | | |
| FOT-1.2 mm | 2 | | 1.5 |
| pFTP-1.2 mm (V0) | 0.95 | | 1 |
| FOT-0.8 mm | | 2.5 | 2.1 |
| pFTP-0.8 mm (V0) | | 0.9 | 1 |
| pFTP-0.8 mm (V1) | | 1 | 1 |
| FOT-0.5 mm | | 5 | 2.7 |
| pFTP-0.5 mm (V1) | | | 1 |
| pFTP-0.5 mm (V2) | | 0.99 | 1 |
| FOT-0.2 mm | | | 4.2 |
| pFTP-0.2 mm (V2) | | | 0.93 |

The data of Table 4 shows that a composition as described herein not only exhibits advantageous flammability properties, it also provides surprisingly superior ultrasonic weld seam strength compared to a polycarbonate compositions not containing polycarbonate-polysiloxane copolymer and impact modifier. Therefore, a process of forming an article by ultrasonic welding at least one part comprising the compositions described herein, and the articles resulting therefrom, are also parts of this invention.

The terms "first," "second," and the like, herein do not denote any order, quantity, or importance, but rather are used to distinguish one element from another, and the terms "a" and "an" and "the" herein do not denote a limitation of quantity, but rather denote the presence of at least one of the referenced item and may include plural referents unless the context clearly dictates otherwise. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs. The endpoints of all ranges directed to the same property or amount are independently combinable and inclusive of the endpoint. The modifier "about" used in connection with a quantity is inclusive of the stated value, and has the meaning dictated by the context, for example the degree of error associated with measurement of the particular quantity. Where a measurement is followed by the notation "(±10%)" or "(±3%)", the measurement may vary within the indicated percentage either positively or negatively. This variance may be manifested in the sample as a whole (e.g., a sample that has a uniform width that is within the indicated percentage of the stated value), or by variation(s) within the sample (e.g., a sample having a variable width, all such variations being within the indicated percentage of the stated value). All references are incorporated herein by reference.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A thermoplastic composition, consisting essentially of:
about 40 to about 80 wt. % of a polycarbonate resin;
about 2 to about 15 wt. % of an impact modifier;
about 10 to about 25 wt. % of a polysiloxane-polycarbonate copolymer comprising polydiorganosiloxane blocks of formula (6):

wherein each R is independently a $C_{1-13}$ monovalent organic radical and D has an average value of about 40 to about 60;
an anti-drip agent; and
about 0.5 to about 20 wt. % of a phosphorus-containing flame retardant, each based on the total combined weight of the thermoplastic composition, exclusive of any filler;
wherein a one-eighth inch (3.18 mm) (±3%) bar comprising the thermoplastic composition has a notched Izod impact strength of at least about 3.6 ft-lb/inch determined in accordance with ASTM D256 at room temperature; and
wherein a sample of the thermoplastic composition having a thickness of about 2.0 mm achieves a UL94 5VB rating in the absence of a brominated and/or chlorinated flame retardant.

2. The composition of claim 1 wherein a sample of the thermoplastic composition having a thickness of about 2.0 mm to about 0.1 mm, when exposed to an open flame, has a flame out time of less than 10 seconds and with no dripping with a probability of first time pass of at least 0.85, in the absence of a brominated and/or chlorinated flame retardant.

3. The composition of claim 1, wherein a sample of the thermoplastic composition having a thickness of about 1.5 mm achieves a UL94 5VB rating in the absence of a brominated and/or chlorinated flame retardant.

4. The composition of claim 1, wherein a sample of the thermoplastic composition having a thickness of about 1.2 mm achieves a UL94 5VB rating in the absence of a brominated and/or chlorinated flame retardant.

5. The composition of claim 1, wherein a sample of the thermoplastic composition having a thickness of about 2.0 mm to about 0.1 mm, when exposed to an open flame, has a flame out time of less than 30 seconds in the absence of a brominated and/or chlorinated flame retardant.

6. The composition of claim 5, wherein the sample has a flame out time of less than 30 seconds without dripping.

7. The composition of claim 6 wherein the sample has a flame out time of less than 10 seconds.

8. The composition of claim 1 wherein a sample of the thermoplastic composition having a thickness of about 2.0 mm to about 0.1 mm, when exposed to an open flame, has a flame out time of less than 10 seconds and with no dripping with a probability of first time pass of at least 0.85, in the absence of a brominated and/or chlorinated flame retardant.

9. The composition of claim 8 wherein the sample has a thickness of about 0.1 mm to about 1.5 mm.

10. The composition of claim 9 wherein the sample has a thickness of about 0.8 mm to about 1.5 mm.

11. The composition of claim 1 comprising more than 5 wt % polysiloxane-polycarbonate copolymer.

12. The composition of claim 1 comprising about 17.5 to about 25 wt. % polysiloxane-polycarbonate copolymer.

13. The composition of claim 1, having a melt viscosity at 260° C./1500 sec$^{-1}$ of about 50 to about 500 Pascal-second, measured in accordance with ISO 11443.

14. The composition of claim 13 wherein a sample of the thermoplastic composition having a thickness of about 0.1 to about 2.0 mm achieves a UL94 V2 rating in the absence of a brominated and/or chlorinated flame retardant.

15. The composition of claim 13, wherein a sample of the thermoplastic composition having a thickness of about 0.1 mm to about 2.0 mm achieves a UL94 V1 rating in the absence of a brominated and/or chlorinated flame retardant.

16. The composition of claim 13, wherein a sample of the thermoplastic composition having a thickness of about 0.1 mm to about 2.0 mm achieves a UL94 V0 rating in the absence of a brominated and/or chlorinated flame retardant.

17. The composition of claim 1, wherein a sample of the thermoplastic composition having a thickness of about 0.1 mm to about 2.0 mm achieves a UL94 V1 rating in the absence of a brominated and/or chlorinated flame retardant.

18. The composition of claim 1, wherein a sample of the thermoplastic composition having a thickness of about 0.1 mm to about 2.0 mm achieves a UL94 V0 rating in the absence of a brominated and/or chlorinated flame retardant.

19. The composition of claim 1, wherein a sample of the thermoplastic composition having a thickness of about 1.2 mm to about 2.0 mm achieves a UL94 5 VB rating in the absence of a brominated and/or chlorinated flame retardant.

20. The composition of claim 1 wherein a one-eighth inch (3.18 mm) (±3%) bar comprising the composition has a notched Izod impact strength of at least about 6 ft-lb/inch determined in accordance with ASTM D256 at room temperature.

21. The composition of claim 1, wherein the polysiloxane-polycarbonate copolymer comprises
aromatic carbonate units of formula (1):

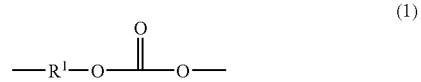

wherein at least about 60 percent of the total number of $R^1$ groups are aromatic organic radicals and the balance thereof are aliphatic, alicyclic, or aromatic radicals; and polydiorganosiloxane units of formula (7)

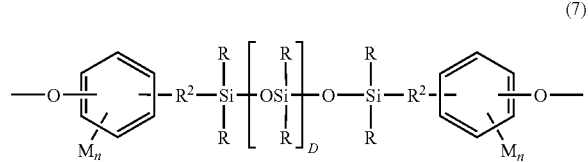

wherein each R is independently a $C_{1-13}$ monovalent organic radical;

D has an average value of about 40 to about 60;

each $R^2$ is independently a divalent $C_2$-$C_8$ aliphatic group;

each M is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy; and each n is independently 0, 1, 2, 3, or 4.

22. The composition of claim 21, wherein $R^1$ is a divalent radical of formula (2):

wherein each of $A^1$ and $A^2$ is a monocyclic divalent aryl radical and $Y^1$ is a bridging radical having one or two atoms that separates $A^1$ from $A^2$; each R is independently a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{10}$ aryl, $C_6$-$C_{10}$ aryloxy, $C_7$-$C_{13}$ aralkyl, $C_7$-$C_{13}$ aralkoxy, $C_7$-$C_{13}$ alkaryl, or a $C_7$-$C_{13}$ alkaryloxy, each $R^2$ is independently a $C_{1-C_3}$ alkylene, each M is independently, and each n is 1.

23. The composition of claim 22, wherein each $Y^1$ is independently —O—, —S—, —S(O)—, —S(O$_2$)—, —C(O)—, methylene, cyclohexyl-methylene, 2-[2.2.1]-bicycloheptyl-idene, ethylidene, isopropylidene, neopentylidene, cyclohexylidene, cyclopentadecylidene, cyclododecylidene, or adamantylidene; each R is independently a $C_{1-8}$ alkyl, trifluoropropyl, $C_{1-8}$ cyanoalkyl, phenyl, chlorophenyl, or tolyl group; each M is a methyl, ethyl, propyl, methoxy, ethoxy, propoxy, phenyl, chlorophenyl, or tolyl group; $R^2$ is a trimethylene group; and R is a $C_{1-8}$ alkyl, trifluoropropyl, $C_{1-8}$ cyanoalkyl, phenyl, chlorophenyl, or tolyl.

24. The composition of claim 23 wherein $A^1$ and $A^2$ are each a divalent phenyl group; $Y^1$ is methylene, cyclohexylidene, or isopropylidene; M is methoxy; and R is methyl, or a mixture of methyl and trifluoropropyl, or a mixture of methyl and phenyl.

25. The composition of claim 1, further comprising a thermoplastic polymer having a Tg of greater than about 20° C., and comprising units derived from a monovinyl aromatic compound, itaconic acid, acrylamide, N-substituted acrylamide methacrylamide, maleic anhydride, maleimide, N-alkyl, aryl or haloaryl substituted maleimide, a glycidyl (meth)acrylate, a monomer of the general formula (12):

wherein R is hydrogen, $C_1$-$C_5$ alkyl, bromo, or chloro and $X^c$ is cyano, $C_1$-$C_{12}$ alkoxycarbonyl, or $C_1$-$C_{12}$ aryloxycarbonyl, or a combination comprising at least one of the foregoing monomers.

26. The composition of claim 1, further comprising a thermoplastic polymer having a Tg of greater than about 20° C., and comprising units derived from styrene, 3-methylstyrene, 3,5-diethylstyrene, 4-n-propylstyrene, alpha-methylstyrene, alpha-methyl vinyltoluene, alpha-chloro styrene, alpha-bromostyrene, dichlorostyrene, dibromostyrene, tetra-chloro styrene, acrylonitrile, ethacrylonitrile, methacrylonitrile, alpha-chloroacrylonitrile, beta-chloroacrylonitrile, alpha-bromoacrylonitrile, methyl acrylate, methylmethacrylate, ethyl acrylate, n-butyl acrylate, n-butyl methacrylate, propyl acrylate, isopropyl acrylate, 2-ethylhexyl acrylate, or a combination comprising at least one of the foregoing monomers.

27. The composition of claim 1, wherein the impact modifier comprises an acrylic impact modifier, an ASA impact modifier, a diene impact modifier, an organosiloxane impact modifier, an organosiloxane-branched acrylate impact modifier, an EPDM impact modifier, a styrene-butadiene-styrene impact modifier, a styrene-ethylene-butadiene-styrene impact modifier, an ABS impact modifier, an MBS impact modifier, a glycidyl ester impact modifier, or a combination comprising at least one of the foregoing impact modifiers.

28. An article comprising the composition of claim 1 and having a wall having a thickness of 3 mm or less.

29. A method for forming an article, comprising molding, extruding or shaping the composition of claim 1 to form the article having a wall having a thickness of 3 mm or less.

30. The method of claim 29 further comprising ultrasonically welding the article to a polymeric part.

31. A method for making an article comprising ultrasonically welding a first part comprising a composition according to claim 1 to a second part.

32. The method of claim 31 wherein the second part comprises a composition according to claim 1.

33. An article comprising a first part comprising a composition according to claim 1 ultrasonically welded to a second part.

34. The article of claim 33 wherein the second part comprises a composition according to claim 1.

\* \* \* \* \*